United States Patent [19]

Kroll

[11] 3,990,408
[45] Nov. 9, 1976

[54] WATER INJECTION SYSTEM FOR INTERNAL COMBUSTION ENGINES

[75] Inventor: Jack Kroll, Bayside, N.Y.

[73] Assignee: Lawrence Peska Associates, Inc., New York, N.Y. ; a part interest

[22] Filed: July 17, 1975

[21] Appl. No.: 596,734

[52] U.S. Cl. .......................... 123/25 C; 123/25 M
[51] Int. Cl.² ........................................ F02D 19/00
[58] Field of Search.............. 123/25 M, 25 P, 25 C, 123/25 R, 25 A, 25 J, 25 N, 25 B

[56] References Cited
UNITED STATES PATENTS

| | | | |
|---|---|---|---|
| 899,625 | 9/1908 | Schneider et al. | 123/25 C X |
| 1,078,816 | 11/1913 | Wright | 123/25 C X |
| 1,155,709 | 10/1915 | Gaston et al. | 123/25 C X |
| 1,711,937 | 5/1929 | Glantz | 123/25 C X |
| 1,848,380 | 3/1932 | Parks | 123/25 C |
| 1,966,671 | 7/1934 | Kramer | 123/25 C |
| 3,908,613 | 9/1975 | Loby | 123/25 C |

*Primary Examiner*—Charles J. Myhre
*Assistant Examiner*—Ira S. Lazarus
*Attorney, Agent, or Firm*—Jack D. Slobod

[57] ABSTRACT

A water injection system includes generally cylindrical fluid valve bodies mounted protruding into each combustion cylinder of an internal combustion engine. The fluid valve bodies are supplied with water from a pump and are actuated by rocker arms and rods following a cam shaft driven synchronously by the engine for injection of water during a predetermined portion of the combustion cycle in each cylinder.

1 Claim, 3 Drawing Figures

WATER INJECTION SYSTEM FOR INTERNAL COMBUSTION ENGINES

FIELD OF THE INVENTION

The present invention relates generally to systems for admixture of water vapor with the fuel-air mixture of an internal combustion engine. In its particular aspects, the present invention relates to the provision of an individual water valve for each cylinder of a combustion engine, which valves are actuated from a cam shaft driven by the engine.

BACKGROUND OF THE INVENTION

Various systems have heretofore been proposed for admixture of water vapor into the fuel-air mixture of an internal combustion engine. The general approach has been to inject water into either the carburetor or intake manifold of the engine. One problem in the prior art is due to the fact that the beneficial combustion influencing effects of the water vapor primarily occur at high engine R.P.M. Accordingly, the prior art has sought to influence the rate of supply of water to the engine as a function of engine R.P.M. by using various indicia of R.P.M. such as intake manifold pressure. Consequently, the prior art systems have been quite complicated.

If a technique could be devised for injecting water directly into each cylinder at an appropriate time during each combustion cycle, the rate of water supply to the engine may automatically be made a function of engine R.P.M. Further, water may be injected at a time not necessarily co-extensive with the opening of the fuel intake valve, providing additional freedom for optimization of the combustion.

OBJECTS OF THE INVENTION

It is an object of the present invention to provide individual means for injecting water into each combustion cylinder of an internal combustion engine.

It is a further object of the present invention to provide water injection apparatus for an internal combustion engine cylinder which is configured for operation during an independently settable portion of the combustion cycle in the cylinders.

SUMMARY OF THE INVENTION

Briefly, the aforementioned and other objects of the present invention are satisfied by mounting individual fluid valve bodies protruding into each cylinder of an internal combustion engine. The valve bodies are supplied with water from a pump, and are individually actuated for injecting water into the combustion cylinders at a predetermined time in the combustion cycle of each cylinder. The valve bodies are actuated by rocker arms and rods following an auxiliary cam shaft driven by the engine. The cams on the cam shaft are configured to define the predetermined times of fluid injection for each cylinder.

Other objects, features, and advantages of the present invention will become apparent upon perusal of the following detailed description of the preferred embodiment thereof when taken in conjunction with the appended drawing wherein.

DETAILED DESCRIPTION

Figure 1:
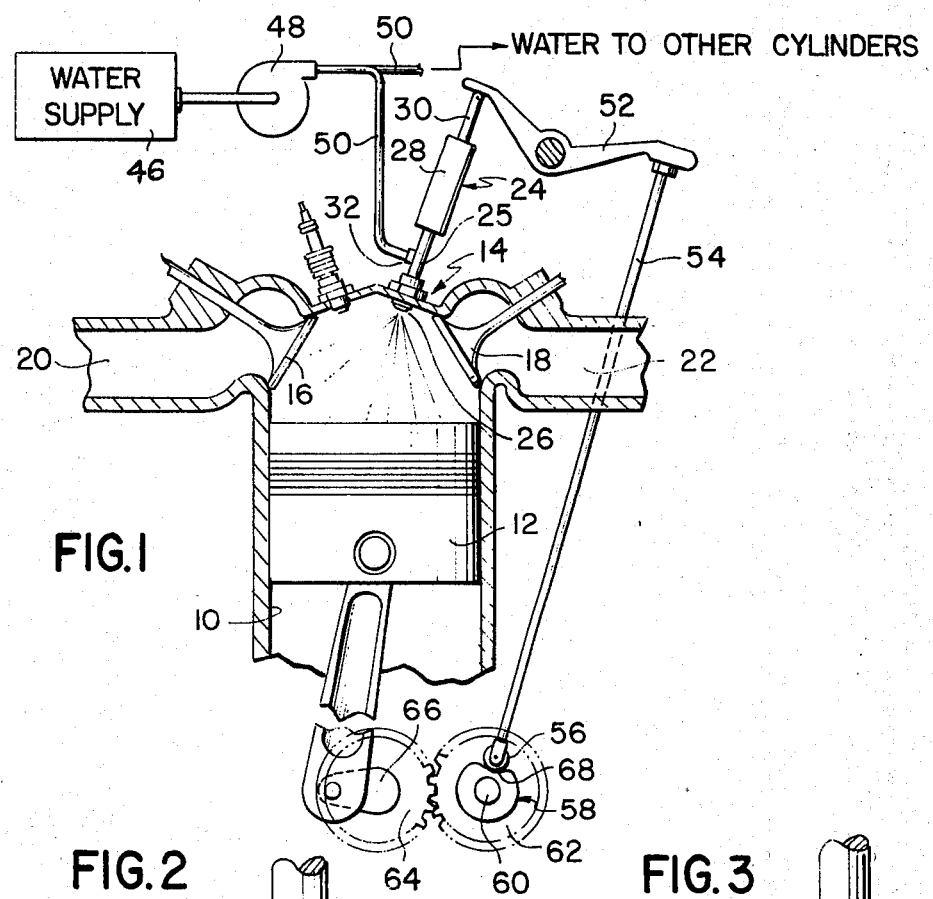
FIG. 1 is a schematic cross-sectional elevation of one combustion cylinder of an internal combustion engine including the fluid valve of the present invention.

Referring first to FIG. 1 of the drawing, there is illustrated a combustion cylinder 10 of an internal combustion engine having a piston 12 mounted for axial reciprocation. As is usual, the top of cylinder 10 is formed by a head 14 carrying the intake and exhaust valve stems 16 and 18 communicating with cylinder 10 for selectively permitting communication between cylinder 10 and the intake and exhaust manifolds 20 and 22. The valve stems 16 and 18 are driven in the usual manner from associated cam shafts via rods and rocker arms (not shown).

Figure 2:
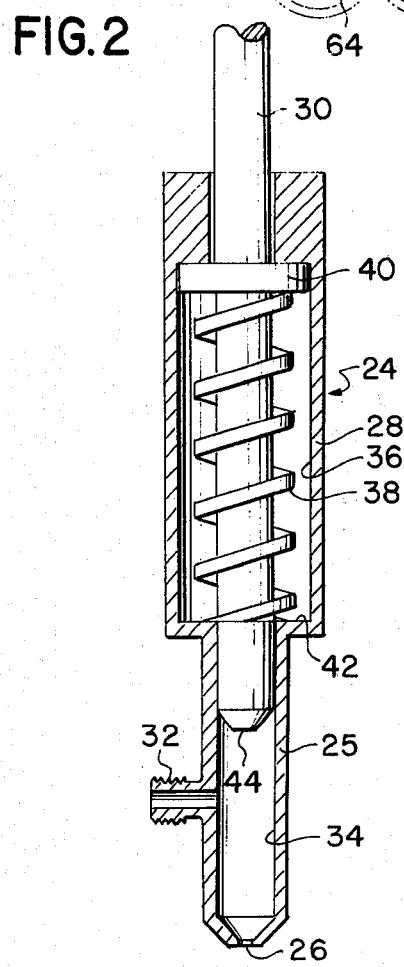
FIG. 2 is an enlarged cross-sectional view of the fluid valve in FIG. 1 with the parts thereof positioned for fluid injection.
Figure 3:
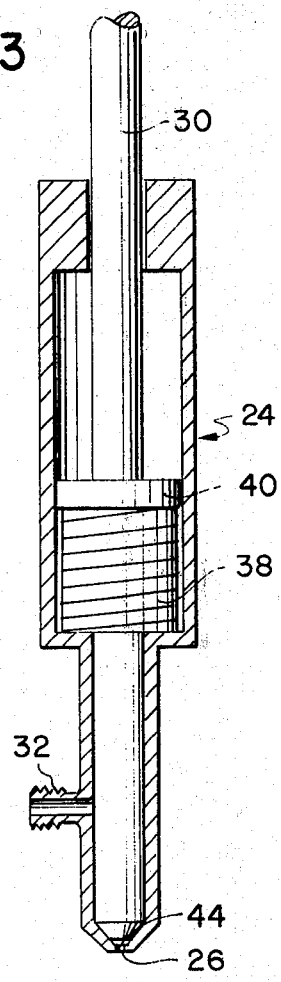
FIG. 3 is a view of the fluid valve similar to FIG. 2 but with the parts thereof positioned for prohibiting fluid injection.

Now referring also to FIGS. 2 and 3, in accordance with the principles of the present invention, individual generally cylindrical valve bodies 24 are mounted through head 12, with a reduced diameter end 25 of each body 24 having a nozzle 26 formed therein, protruding into each of the different cylinders 10 of the engine. Valve body 24 has at an end remote from nozzle 26 an increased diameter cylindrical portion 28. An axially slideable valve stem 30 protrudes coaxially from cylindrical portion 28.

As best shown in FIGS. 2 and 3, a water inlet 32 projects radially from reduced diameter cylindrical portion 25 and intersects an axial bore 34 within portion 26 which bore terminates in nozzle 26. The valve stem 30 is generally cylindrical and is of a diameter for a sliding fit in bore 34. The enlarged cylindrical portion 28 has an enlarged bore 36 which houses a compressible spring 38. Spring 38 which encircles cylindrical valve stem 30 and is trapped axially between a radial shoulder 40 carried by valve stem 30 and a radial step 42 in the valve body. The step 42 defines the transition between portions 25 and 28 of the valve body 24.

The valve stem 30 is normally urged upward by spring 38 to a position shown in FIG. 2 where the bottom end 44 of stem 30 is above inlet 32. As is apparent, this position permits fluid from inlet 42 to enter bore 34 and exit nozzle 26 into the engine cylinders 10. If however, stem 30 is pushed downward, compressing spring 38, as shown in FIG. 3, the bottom end 44 thereof lies below inlet 32, closing off the inlet and preventing the discharge of water into the cylinder 10.

Now referring again to FIG. 1, pressurized water is supplied to the fluid inlet 32 for each valve body 24 from a suitable water supply reservoir 46, via a pump 48 and distribution pipes 50.

For permitting injection of water into cylinders 10 at an appropriate time in the combustion cycle in each cylinder 10, the valve stem 30 is controlled by a rocker arm 52, which is pivoted in response to a reciprocating rod 54. Rod 54 terminates in a roller 56 which is positioned in following relationship on an associated cam 58 carried by an auxiliary cam shaft 60. The cam shaft 60 includes a pinion 62 in engagement with a substantially identical pinion 64 on engine drive shaft 66 for driving cam shaft 60 synchronously with drive shaft 66.

As should be apparent, cam shaft 60 carries plural properly phased cams 58 in one to one correspondence with each combustion cylinder 10. Each cam 58 is generally circular and of a diameter for rocking arm 52 to exert pressure on valve stem 30 for achieving the closed position of the valve body shown in FIG. 3. Over a small sector of the cam 58, a reduced diameter portion 68 is provided which permits the pressure on valve stem 30 to be released, allowing the valve stem to be urged by spring 38 to the position shown in FIG. 2 for injection of water into the cylinder 10.

Preferably, the cams 58 are phased for water to be injected into the cylinders 10 just after the termination of the exhaust cycle therein to permit adequate time for the water to vaporize.

Having described the preferred embodiment of the present invention in detail, it should be understood that numerous modifications, additions, and omissions in the details thereof are possible within the intended spirit and scope of the invention.

What is claimed is:

1. In combination with an internal combustion engine having at least one combustion cylinder characterized by a combustion cycle; fuel intake and exhaust ports intersecting said cylinder; intake valve means located at the intersection of said intake port and said combustion cylinder for controlling the supply of fuel to said combustion cycle; exhaust valve means located at the intersection of said exhaust port and said combustion cylinder for controlling the exhausting of combustion products from said cylinder in synchronism with said combustion cycle; the improvement for injecting water into said combustion cylinder in synchronism with said combustion cycle comprising:

a. fluid valve means mounted in communication with said combustion cylinder; said fluid valve means comprising: a generally cylindrical body having a circular bore therein; nozzle means at one end of said bore in communication with said combustion cylinder at a point intermediate said intake and exhaust ports; a fluid inlet port radially intersecting said bore; and reciprocatable valve stem means longitudinally moveable within said bore for selectively covering or uncovering said fluid inlet port;
   b. pump means coupled to said fluid inlet port for supplying water to said fluid valve means;
   c. a rotary cam shaft driven by said engine;
   d. an eccentric cam carried by said cam shaft;
   e. and linkage means following said cam and coupled for reciprocating said valve stem in response to rotation of said cam shaft, said linkage means comprising: an elongated rocker arm pivotally supported at a point intermediate its length; one end of said rocker arm engaging an end of said valve stem; an elongated reciprocatable rod engaging at one of its ends the other end of said rod carrying a roller in following relationship to said cam.

\* \* \* \* \*